March 8, 1927.  1,620,439

C. W. CARTER

SCALPER

Filed Jan. 8, 1926  2 Sheets-Sheet 1

Inventor
Clarence W. Carter
By his Attorneys

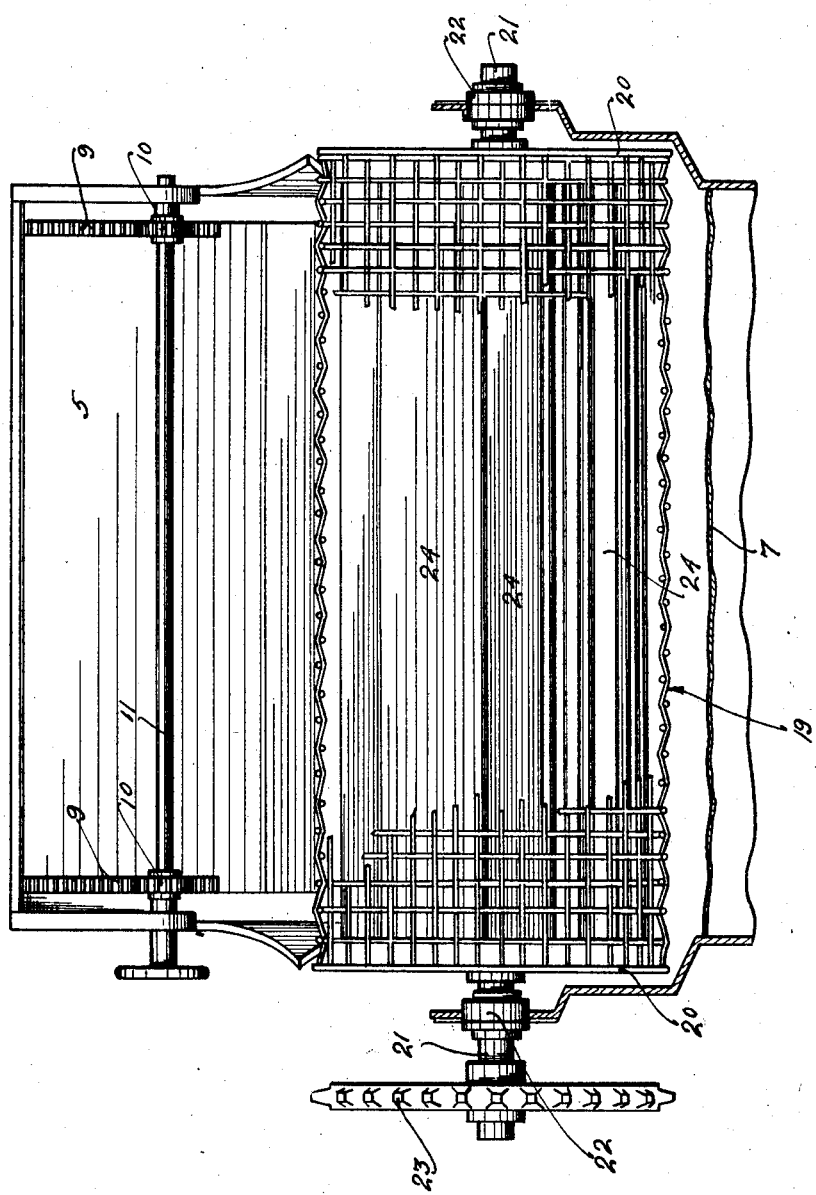

Patented Mar. 8, 1927.

1,620,439

UNITED STATES PATENT OFFICE.

CLARENCE W. CARTER, OF MINNEAPOLIS, MINNESOTA, ASSIGNOR TO CARTER-MAYHEW MANUFACTURING COMPANY, OF MINNEAPOLIS, MINNESOTA, A CORPORATION OF MINNESOTA.

SCALPER.

Application filed January 8, 1926. Serial No. 79,984.

My present invention is directed to an improvement in that type of grain scalper and cleaner disclosed and broadly claimed in my pending application Serial No. 734,423, filed August 27, 1924, and the patent on which application is due to issue on January 5, 1926. In the scalper of the said earlier application, and endless travelling screen, preferably in the form of a drum, was combined with grain-directing and retaining means and cooperating devices arranged to cause the grain to accumulate in compact mass against the inner and outer sides of the screen so that the screen, in passing through the compact mass, would tail over long and large foreign substances, while the grain or good stock would pass freely through the screen.

As a salient feature, the present invention provides novel means for holding back and controlling the flow of the grain or stock through the screen so that the stock will be caused to accumulate in compact mass against the surfaces of the screen as above stated. The novel means here employed for the purpose stated is preferably a plurality of circumferentially spaced baffle plates located within and arranged to travel with the rotary endless screen. In the preferred arrangement, these baffle plates are circumferentially spaced in eccentric overlapped arrangement within the cylindrical screen and, in such arrangement, they not only hold back the grain and prevent the same from pouring too rapidly through the screen but act in a sense as a feed device to insure positive even flow of the grain while holding it back only enough to cause the accumulation of the grain in mass against the upwardly moving portion of the screen.

The preferred arrangement just referred to is illustrated in the accompanying drawings, wherein like characters indicate like parts throughout the several views.

Referring to the drawings:

Fig. 2 is a transverse vertical section taken approximately on the line 2—2 of Fig. 1.

Figure 1:
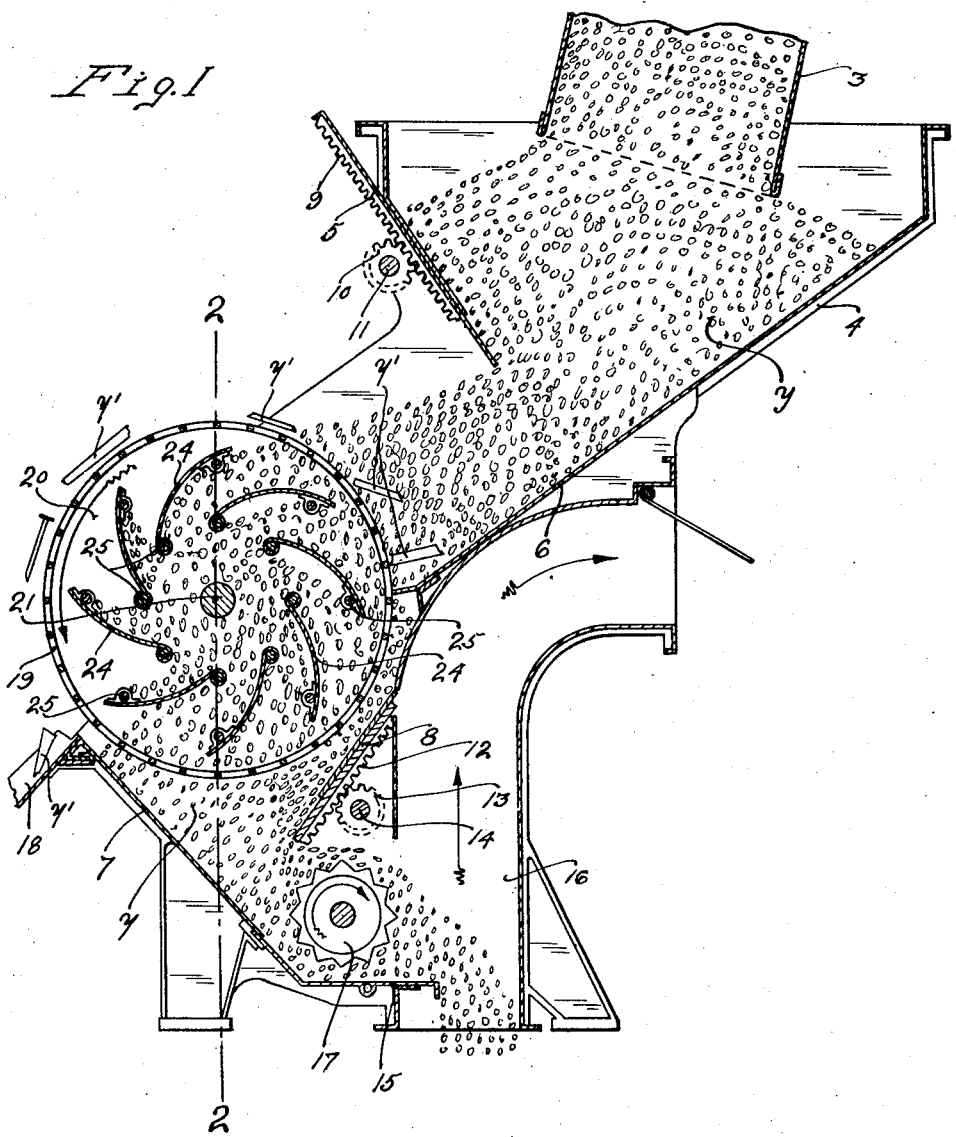
Fig. 1 is a vertical section illustrating the invention.

In the arrangement shown, the commingled grain will be delivered by a spout 3 into a main or primary hopper 4 having at its bottom a slidably adjustable discharge gate 5 that controls the flow of the grain, under the action of gravity, from the hopper to an inclined discharge spout 6. The spout 6 delivers to a secondary hopper or receiving chamber 7 having an inclined bottom and a slidable discharge-controlling gate 8. In the arrangement of the gates illustrated, the gate 5 is provided with rack bars 9 engaged by pinions 10 on a gate-adjusting shaft 11 journaled in suitable bearings in the side flanges of the hopper 4; and the gate 8 is provided with rack bars 12 engaged by pinions 13 of a gate-adjusting shaft 14 journaled in suitable bearings in the sides of the hopper 7. The hopper 7 is shown as provided with a discharge spout 15 that delivers into an air stack 16 through which air may be assumed to be drawn upwardly. As shown, also, the numeral 17 indicates a feed roller located in the discharge spout 15.

The outer side of the hopper 7 extends up to a point where it joins with the upper end of a refuse-discharge spout 18.

The endless moving screen is in the form of a cylindrical horizontally disposed rotary drum 19 arranged to intercept the grain coming from the primary hopper through the spout 6 on its way to or toward the secondary hopper. This drum-like screen 19 is of coarse mesh and is secured at its ends to heads 20, which, in turn, are secured to a horizontal shaft 21 journaled in suitable bearings 22 applied on the sides of the hopper 7. At one end, the shaft 21 is shown as provided with a sprocket 23 over which a power-driven sprocket chain may be run to rotate the cylindrical screen in a counter-clockwise direction in respect to Fig. 1.

Within the cylindrical screen are the flow-restraining baffle plates 24 referred to above. These baffle plates are slightly curved in the direction of rotation of the screen and are eccentrically disposed so that their inner edges underlap the outer portions of adjacent baffle plates. As an efficient way of securing the baffle plates in the position stated, they are secured to rods 25, the ends of which are attached to the heads 20. By reference to Fig. 1, it will be noted that, in respect to the direction of rotation of the screen, the forward edges of said baffle plates are radially inward. This arrangement is important for several reasons. It causes the baffle plates, in their upward movement, to keep the grain pressed outward and backward and against the interior of the screen, and as the baffle plates reach their highest positions, they afford downwardly extended channels for directing the grain to the central portion of the screen while the baffle plates at the lower portion of the screen guide the grain on downward into the secondary hopper 7. It may be here noted that when the screen is standing still and the feed roller 17 is also idle, the discharge of grain from the secondary hopper will be held back or stopped.

It is important to note that the rotary screen is arranged to revolve in the direction of the arrow marked thereon in Fig. 1. This direction of rotation carries the radially inner edges of the baffle plates 24 ahead of the outer edges in respect to the direction of rotation and causes said plates to have an outward camming or crowding action on the stock, and this outward crowding action holds back the flow and prevents the same from being crowded to and packed at the center of the screen.

Under rotation of the cylindrical screen as described, the baffle plates will positively prevent the grain that passes into the screen from being carried over and delivered into the refuse-discharge spout 18. Nevertheless, under rotation of the screen, the said baffle plates keep the grain thoroughly stirred up and permit gravity to produce the flow of grain but hold back or restrain the flow to the extent above stated. Moreover, it has been found that the baffle plates, under rotation of the screen, have a feed-regulating action and will produce or permit a rapid flow of grain through the screen and, at the same time, insuring the accumulation of stock against the upwardly moving surface of the screen.

Obviously, it will be the upwardly moving portion of the screen that will carry off the scalpings or refuse, such as sticks, straws, nails or any other large or long foreign substances. To accomplish this result, the screen does not need to be of fine mesh but the scalping action is produced by turning of the long objects transversely of the direction of flow of the grain and in the direction of the rotation of the screen so that such objects will be laid or placed on the screen and carried over and discharged into the refuse spout 18, or if the latter be not provided, at any rate to a place outside of the secondary grain hopper. Another advantage in the described arrangement of the baffle plates is that they are incorporated as a part of the screen structure and, hence, reinforce the same and are themselves, in turn, supported by the screen structure.

What I claim is:

1. In a scalping machine, an endless travelling screen, means for delivering commingled stock against said screen, flow-restraining baffle plates located within said screen and spaced in the direction of the travel thereof, said baffle plates being obliquely set in respect to the direction of travel, and means for imparting travelling movement to said screen, whereby said baffle plates will retard the flow of the stock delivered against said screen and said screen will tail over large and long foreign substances while the main stock will pass through said screen and between said baffle plates.

2. In a scalping machine, a drum-like rotary screen, means for delivering commingled stock against said screen, flow-restraining baffle plates circumferentially spaced within said screen, said plates being obliquely set in respect to the direction of rotation, and means for rotating said screen in a direction to cause the inner edges of said baffle plates to move circumferentially ahead of the outer edges thereof, and whereby said baffle plates will have an outward crowding action on the stock and said screen will tail over large and long foreign substances while the main stock will pass through said screen and between said baffle plates.

3. In a scalping machine, a drum-like rotary screen arranged to rotate on an approximately horizontal axis, means for delivering commingled stock against the upwardly moving side of said screen, flow-restraining baffle plates circumferentially spaced within said screen, said plates being obliquely set in respect to the direction of rotation, and means for rotating said screen in a direction to cause the inner edges of said baffle plates to move circumferentially ahead of the outer edges thereof, and whereby said baffle plates will have an outward crowding action on the stock and said screen will tail over large and foreign substances while the main stock will pass through said screen and between said baffle plates.

4. The structure defined in claim 1 in which the inner edges of said baffle plates are spaced radially from but are overlapped circumferentially with the outer edges of adjacent baffle plates.

5. The structure defined in claim 3 in which the inner edges of said baffle plates are spaced radially from but are overlapped circumferentially with the outer edges of adjacent baffle plates, the inner edges of said baffle plates being equi-distant from the axis of said screen and the outer edges of said plates being equi-distant from the axis of said screen.

6. The structure defined in claim 3 in further combination with a receiving hopper immediately below said screen and means for retarding the discharge from said receiving hopper, whereby the stock may be caused to bank up within said screen.

In testimony whereof I affix my signature.

CLARENCE W. CARTER.